United States Patent [19]
Benavides et al.

[11] Patent Number: 5,328,180
[45] Date of Patent: Jul. 12, 1994

[54] RIGID CLAMP

[75] Inventors: Gilbert L. Benavides; Jack D. Burt, both of Albuquerque, N. Mex.

[73] Assignee: Sandia Corporation, Albuquerque, N. Mex.

[21] Appl. No.: 49,683

[22] Filed: Apr. 16, 1993

[51] Int. Cl.⁵ .............................. B23B 31/40
[52] U.S. Cl. .................... 279/2.16; 166/206; 175/230; 269/48.1; 279/2.19
[58] Field of Search ........... 269/48.1; 279/2.1, 2.16, 279/2.18, 2.19, 2.24; 242/68.2, 72 R; 166/206; 175/98, 99, 230

[56] References Cited

U.S. PATENT DOCUMENTS

| 1,337,017 | 4/1920 | Kenworthy | 242/72 R |
| 2,323,039 | 6/1943 | Hill | 269/48.1 |
| 2,711,862 | 6/1955 | Kerr | 242/72 R |
| 4,061,289 | 12/1977 | Miura et al. | 242/72 R X |
| 4,763,850 | 8/1988 | Hausner | 242/72 R X |

FOREIGN PATENT DOCUMENTS 1197717 7/1965 Fed. Rep. of Germany .... 242/72 R

OTHER PUBLICATIONS

"Standard Handbook of Machine Design" by Shigley & Mischke-p. 39.7.

*Primary Examiner*—Steven C. Bishop
*Attorney, Agent, or Firm*—Timothy D. Stanley

[57] ABSTRACT

The invention relates to a clamp mechanism that can be used to attach or temporarily support objects inside of tubular goods. The clamp mechanism can also be modified so that it grips objects. The clamp has a self-centering feature to accommodate out-of-roundness or other internal defections in tubular objects such as pipe. A plurality of clamping shoes are expanded by a linkage which is preferably powered by a motor to contact the inside of a pipe. The motion can be reversed and jaw elements can be connected to the linkage so as to bring the jaws together to grab an object.

32 Claims, 12 Drawing Sheets

RIGID CLAMP

The United States Government has rights in this invention pursuant to Contract No. DE-AC04-76DP00789 between the Department of Energy and American Telephone and Telegraph Company.

FIELD OF THE INVENTION

The field of this invention relates to articles useful for clamping or grasping an object or one object to another. It has a variety of applications, including robotics and support of downhole tools used in a variety of procedures such as exploration and production of oil and gas.

BACKGROUND OF THE INVENTION

The petroleum industry has used clamping mechanisms in a variety of applications. One such application is for cross-well seismic surveying. Another use is for well casing/cement bond diagnostics. The vibratory source in borehole surveying requires a rigid clamp to couple seismic energy. At the same time, the seismic receiver also requires a clamp for good coupling. Seismic imaging technology has uses in the analysis of nuclear waste storage, repository sites, and for the study of geological features. A clamp is a mechanism that secures body A to body B. A rigid clamp does not allow for relative motion between A and B. For example, a vise is a clamp that secures body A (the work piece) to body B (the table); however, it may not be stiff because of the movable vise jaw. A collet is a clamp that is fairly stiff and self-centering for circular cross-section work pieces; however, it requires a wedging action that causes the "clamping force" to vary with the relative displacement between the work piece (both A) and the collet housing (body B).

In robotics, gripping and placement of objects is frequently required. The gripping mechanism is at times required to grab odd shaped objects. In particular, a robotic end effector used for positioning a workpiece during a machining operation would require a rigid clamp.

In the past, wedging techniques have been developed for clamps. These types of clamps have been difficult to set and release particularly due to the sensitivity of such clamps to external forces acting on the clamp; for example, a collet or a camming-type clamp.

In an effort to improve on the clamping devices and techniques of the prior art, the apparatus of the present invention has been developed with an eye toward providing a clamp that has a simple structure to build and, at the same time, operates reliably to support or grasp an object. Specifically, with an eye toward downhole applications, where it is recognized that the well casing has surface irregularities and a certain amount of out-of-roundness, the clamp of the present invention has been designed to compensate for such irregularities and out-of-roundness to obtain a substantial grip on such casing. To accomplish such an object, the clamp mechanism has been developed with a self-centering feature. A further object of the invention is to eliminate the prior designs' reliance on a wedging action or compliant mechanisms and to provide a simple structure that presents more consistent and constant holding force.

SUMMARY OF THE INVENTION

The invention relates to a clamp mechanism that can be used to attach or temporarily support objects through internal features of tubular goods. The clamp mechanism can also be modified so that it grips objects. The clamp has a self-centering feature to accommodate out-of-roundness or other internal imperfections in tubular objects such as pipe. A plurality of clamping shoes are expanded and retracted by a linkage which is preferably powered by a motor to contact the inside of a pipe or to grasp the object. The alignment of the components can be reversed and jaw elements can be connected to the linkage so as to bring the jaws together to grab external features of an object.

DETAIL DESCRIPTION OF THE DRAWINGS

DETAILED DESCRIPTION OF THE PREFERRED EMBODIMENT

Figure 1:
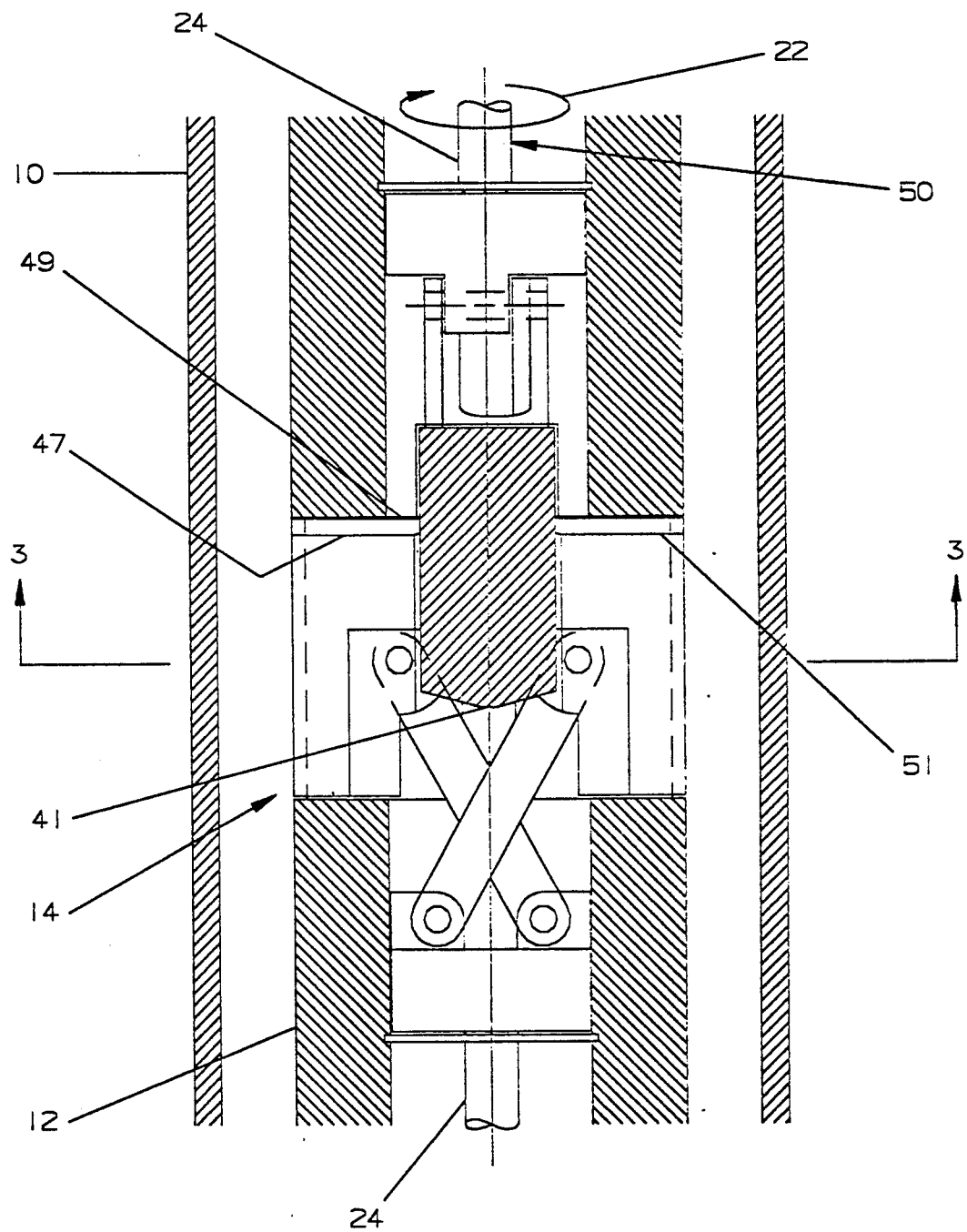
FIG. 1 is a sectional elevational view of the clamp of the present invention in the run-in position.

The clamping apparatus A of the present invention is shown in FIG. 1. There, the view is a sectional view in a wellbore illustrating the well casing 10 to which the apparatus A is to be selectively anchored at the desired depth.

Figure 2:
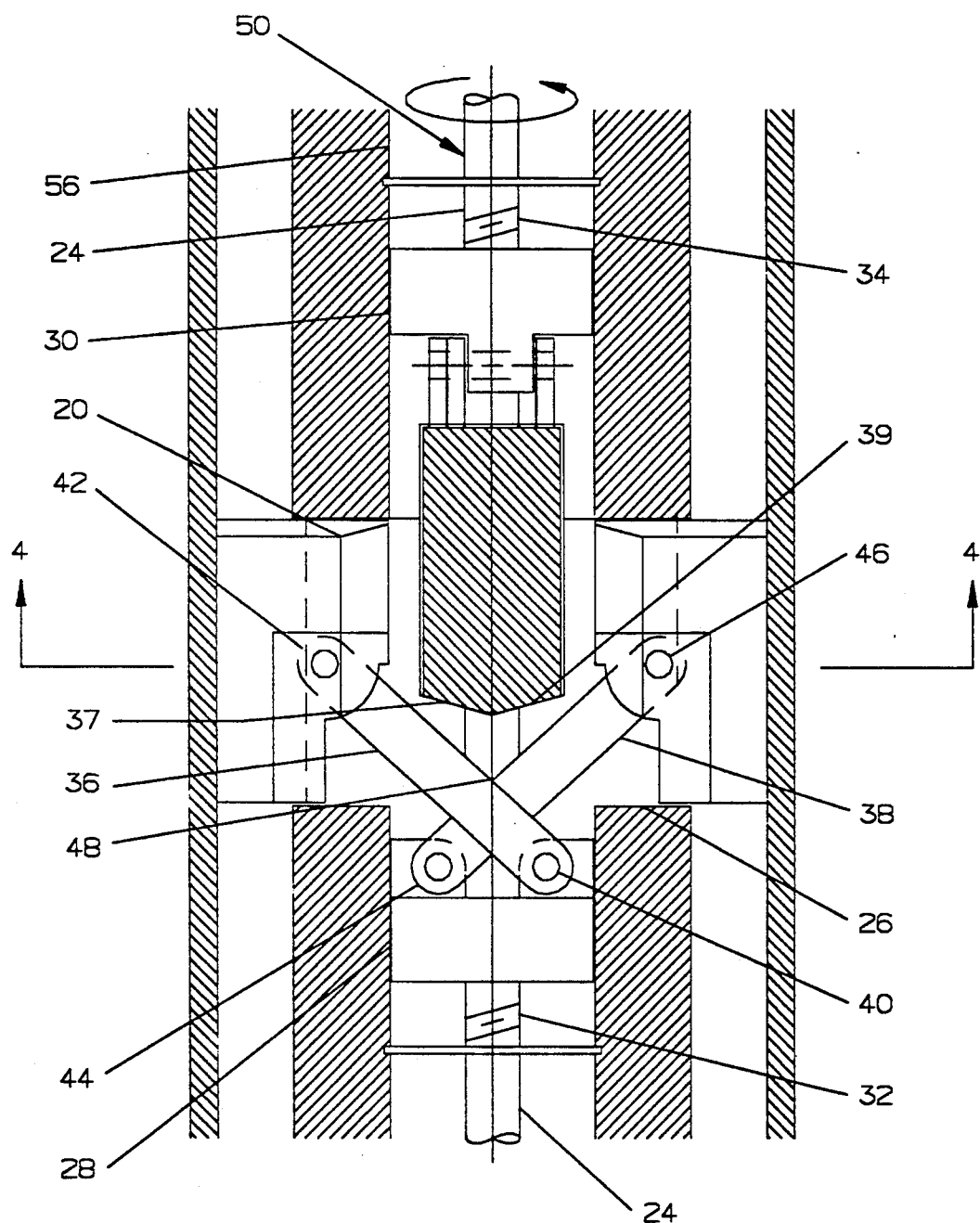
FIG. 2 is a sectional elevational view of the clamp of the present invention in the set position.
Figure 3:
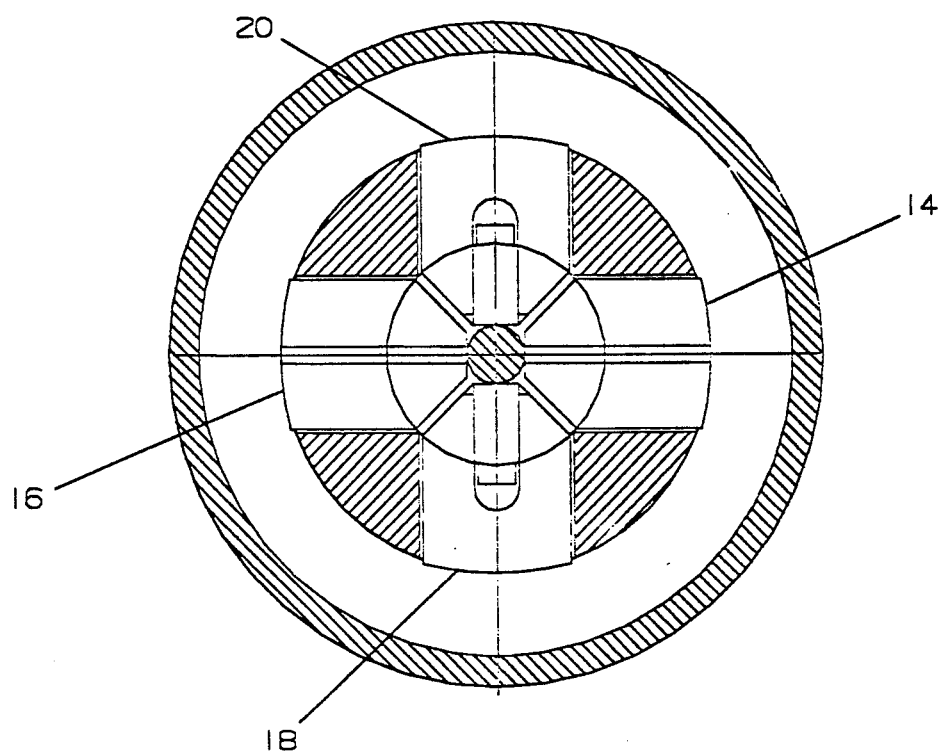
FIG. 3 is the view along lines 3—3 of FIG. 1.
Figure 4:
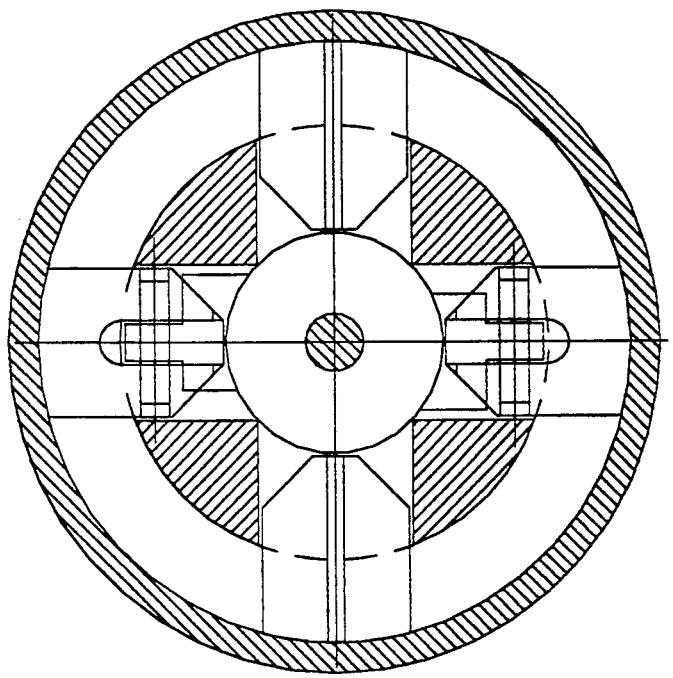
FIG. 4 is the view along lines 4—4 of FIG. 2.

As previously stated, a wide variety of tools can be employed in conjunction with the apparatus A. Typically, a component in the tool to be selectively supported off the casing 10 will have a housing 12. Typically, housing 12 is tubular in nature to accommodate the internal components of the apparatus A, as well as the other components that make the downhole tool function. The particular type of tool to be supported can be any one of a wide variety of tools. The apparatus A is directed to the means of selectively positioning the tool in the casing 10. As seen in FIGS. 1 and 3, the preferred embodiment has four shoes 14, 16, 18, and 20. The shoes 14, 16, 18, and 20 are retracted to a position even with or within housing 12 for the run-in position shown in FIG. 1. Referring to FIG. 2, it is seen that in the preferred embodiment the shoes are operable in pairs, with shoes 14 and 16 disposed diametrically opposite each other and operable in tandem, while shoes 18 and 20 are also disposed diametrically opposite each other and operate in tandem. It should be noted that different numbers of shoes and different angular orientations of such shoe or shoes can be used without departing from the spirit of the invention.

To operate the shoes 14, 16, 18, and 20 to engage the casing 10, a motor or other means of creating a torque, schematically illustrated as arrow 22, is connected to a shaft 24. Shaft 24 is threaded and extends on both sides of openings 26. Openings 26 guide the radial outward and inward movements of shoes 14, 16, 18, and 20.

Mounted over shaft 24 are nuts 28 and 30. The motor 22 can rotate shaft 24 while nuts 28 and 30 are restrained against rotation within housing 12 because they are linked to shoes 14, 16, 18, 20. Shaft 24 has opposite hand threads 32 and 34 such that rotation of motor 22 allows nuts 28 and 30 to move toward each other, as seen by comparing FIG. 1 to FIG. 2, or in the reverse direction, as seen by comparing FIG. 2 back to FIG. 1. While nuts 28 and 30 cannot rotate, they are free to translate longitudinally as motor 22 turns shaft 24.

Connecting shoes 14 and 16 to nut 28 are links 36 and 38. Link 36 is pinned to nut 28 at pivot 40 and to shoe 16 at pivot 42. Link 38 is pivotally mounted to nut 28 at pivot 44 and to shoe 14 at pivot 46. Links 36 and 38 cross over each other to allow for a smaller diameter package for the clamp. The same type of linkage, but turned in a mirror image and in a plane rotated preferably 90° along the longitudinal axis, connects shoes 18 and 20 to nut 30. In essence, the linkage comprising of links 36 and 38 has a vertex 48 which is oriented downwardly in the wellbore. The exact same linkage preferably used to connect shoes 18 and 20 to nut 30 has another vertex which is oriented upwardly. The use of the mirror image layout makes the apparatus more compact as the linkage components may be overlapped to some degree. Significantly, such mirror image construction makes the St. Aness or rigidity of the apparatus A identical to forces along its longitudinal axis in either direction.

Another feature of the apparatus A is the coupling 50 on shaft 24. Coupling 50 allows the motor 22 to continue to drive shaft 24, even if one of nuts 28 and 30 is immobilized. In the preferred embodiment, since nuts 28 and 30 are opposite hand when they both bind due to contact of shoes 14, 16, 18, and 20, the motor 22 stalls because shaft 24 can no longer translate. When this occurs, shaft 24 can rotate and translate while coupling 50 continues to transmit the rotational input of motor 22. Accordingly, shaft 24 can translate while it is being driven by motor 22. The significance of the translation feature in shaft 24 becomes apparent when two of the shoes such as 14 and 16 bind on an imperfection in casing 10. Since nut 28 looses its freedom to translate axially once shoes 14 and 16 bind, the coupling 50 allows continued rotational input by motor 22. At that point, shaft 24 will continue to rotate and literally advance axially. As that occurs, the remaining shoes 18 and 20, which have not become bound against the casing 10, will continue to move radially outwardly until they, too, come in contact with casing 10. The coupling 50 allows the transmission of a rotational force to continue until all four shoes bind. Those skilled in the art will appreciate that shoes, such as 14 and 16, extend through an opening 26 which is contoured to their shape, but nut 28 is literally incapable of rotation. However, using a linkage, such as 36 and 38, axial or longitudinal movements of nut 28 can retract shoes 14 and 16 as shown in FIG. 1, or extend them as shown in FIG. 2. The same conditions are equally applicable to nut 30 in combination with shoes 18 and 20.

Accordingly, when the casing 10 is out-of-round or has an internal imperfection, and the housing 12 is positioned as shown in FIG. 1, initial operation of motor 22 could make shoes 14 and 16 seat against casing 10 first. Once shoes 14 and 16 are restrained from further radially outward movement, nut 28, due to links 36 and 38, can no longer move (translate or rotate) with respect to housing 12. However, at this point, shoes 18 and 20 have yet to seat against the casing 10. The motor 22 can continue to operate to further drive shoes 18 and 20 until they, too, engage the casing 10. As soon as shoes 14 and 16 bind first, continued operation of motor 22 turns shaft 24. As shaft 24 continues to turn, nut 28 is now in a bind and cannot move longitudinally. As a result, shaft 24 moves longitudinally with respect to the now constrained nut 28. In order to allow shaft 24 to move longitudinally with respect to nut 28, coupling 50 allows for longitudinal free play (relative translation between shaft 24 and the motor) while continuing to drive shaft 24, a form of a lost-motion feature. Accordingly, coupling 50 allows torque to be transmitted from motor 22 to shaft 24, while at the same time, allowing a portion of shaft 24 on one side of coupling 50 to move longitudinally toward or away from the motor shaft adjacent motor 22. In this respect, the apparatus of the present invention has a self-centering feature which takes into account the imperfections of a casing 10. Likewise, shoes 18 and 20 may bind first, yet shoes 14 and 16 will continue to move radially until they, too, bind. Essentially, this mechanism tends to equalize the clamping forces among all four clamping shoes.

It should be noted that the placement of motor 22 can be downhole as shown in FIG. 1 or uphole above nut 28 without departing from the spirit of the invention. While a motor is discussed as the motive force for rotating shaft 24, other sources of input motion can be used in lieu of motor 22 without departing from the spirit of the invention. Such input forces are not limited to rotational as it is within the scope of the invention to operate shaft 24 with other types of force inputs. Nuts 28 and 30 may also conform to the internal surface 56 of housing 12 in such a way as to additionally prevent their rotation while allowing longitudinal translation in response to rotation of shaft 24. The placement of coupling 50 may be altered from the preferred point between motor 22 and the first nut 30 without departing from the spirit of the invention.

Figure 5:
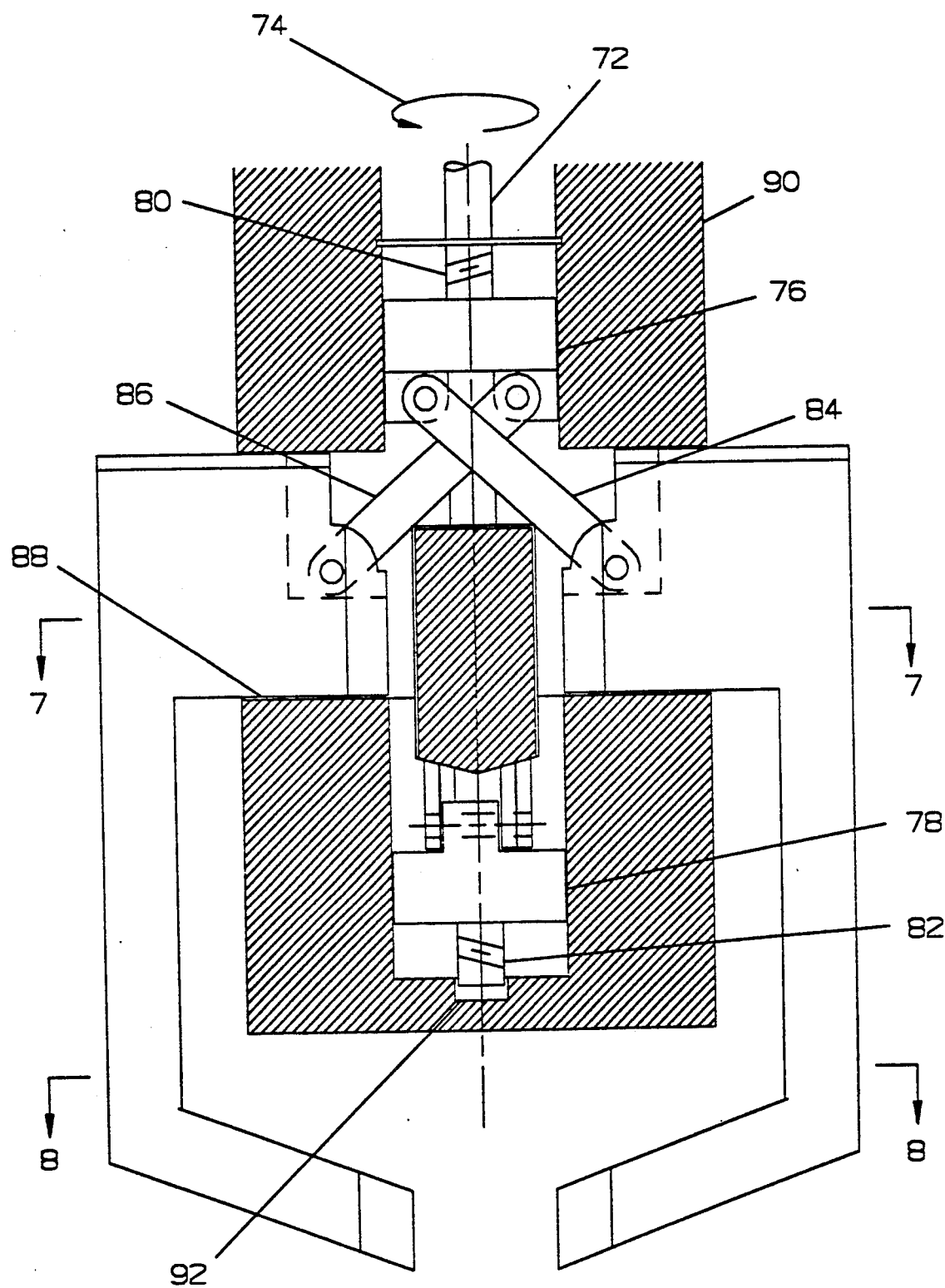
FIG. 5 is a grasping version embodiment of the present invention in the open position.
Figure 6:
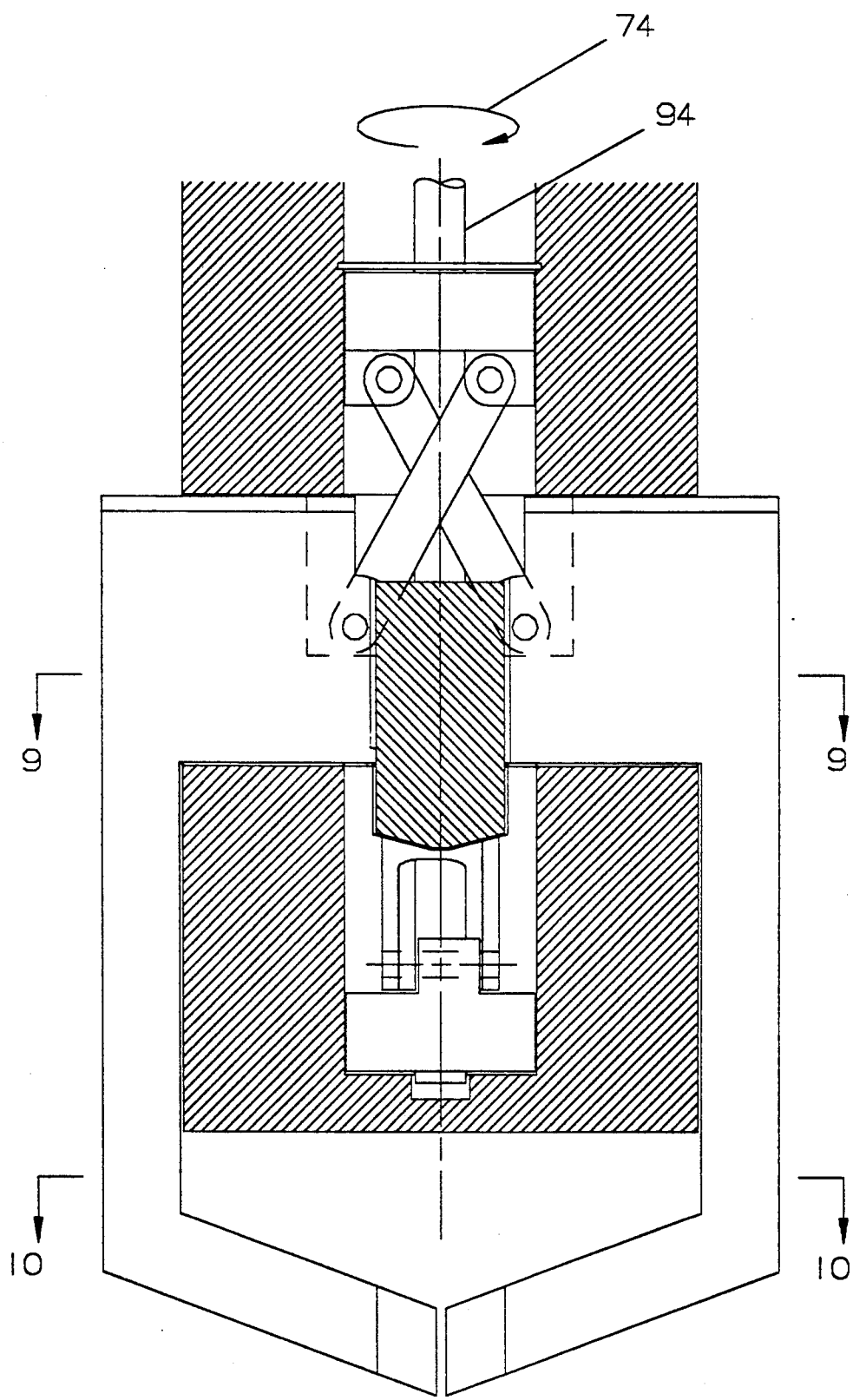
FIG. 6 is the clamp shown in FIG. 5 in the closed position.
Figure 7:
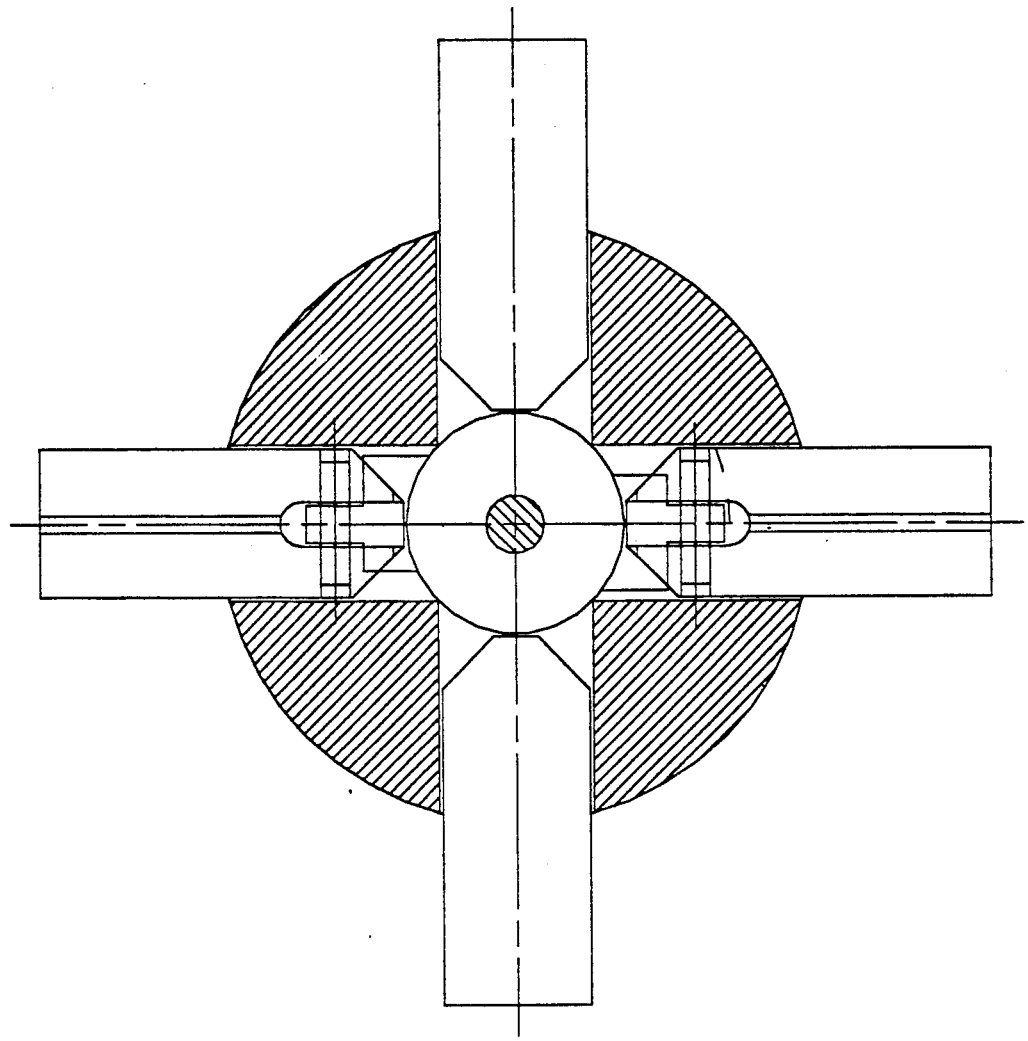
FIG. 7 is the view along lines 7—7 of FIG. 5.
Figure 8:
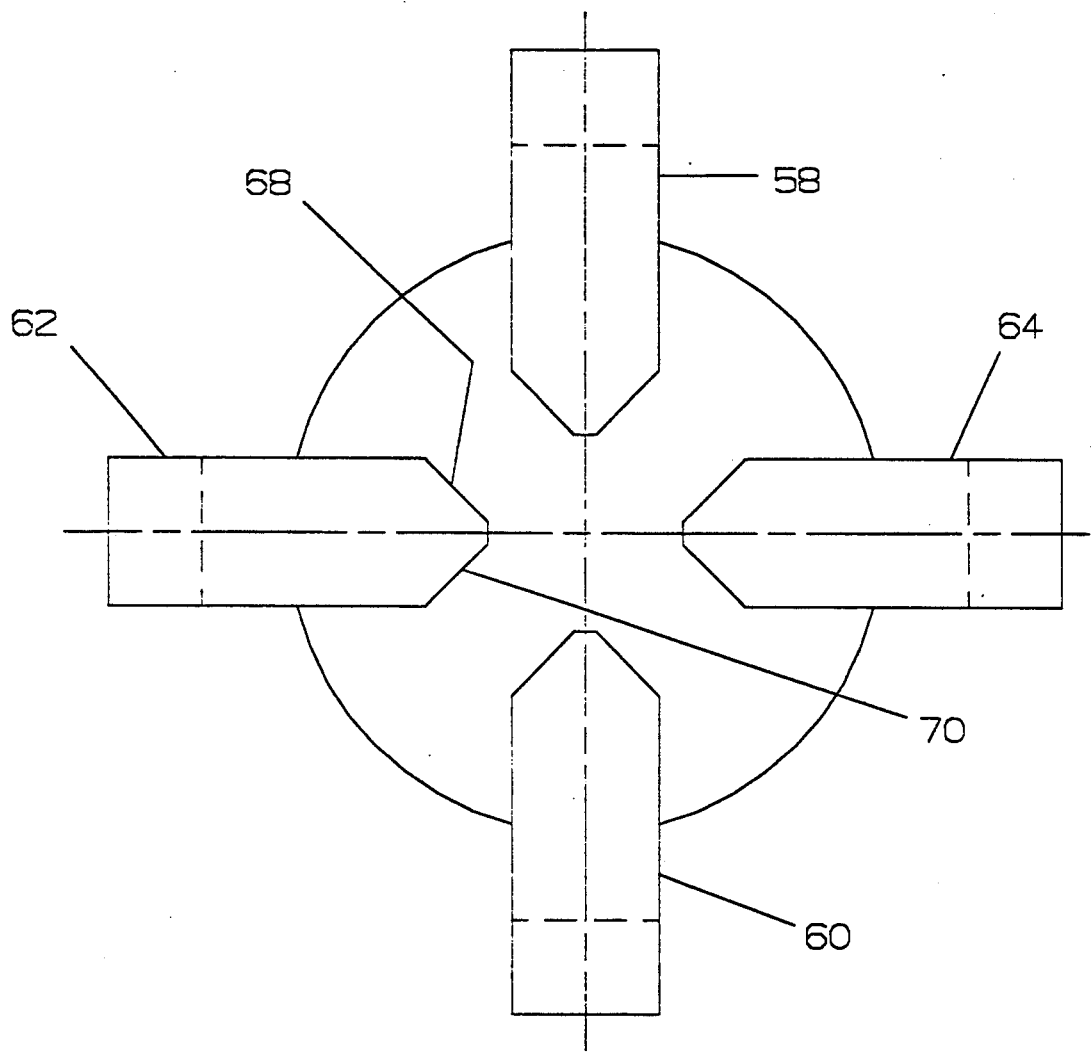
FIG. 8 is the view along lines 8—8 of FIG. 5.
Figure 9:
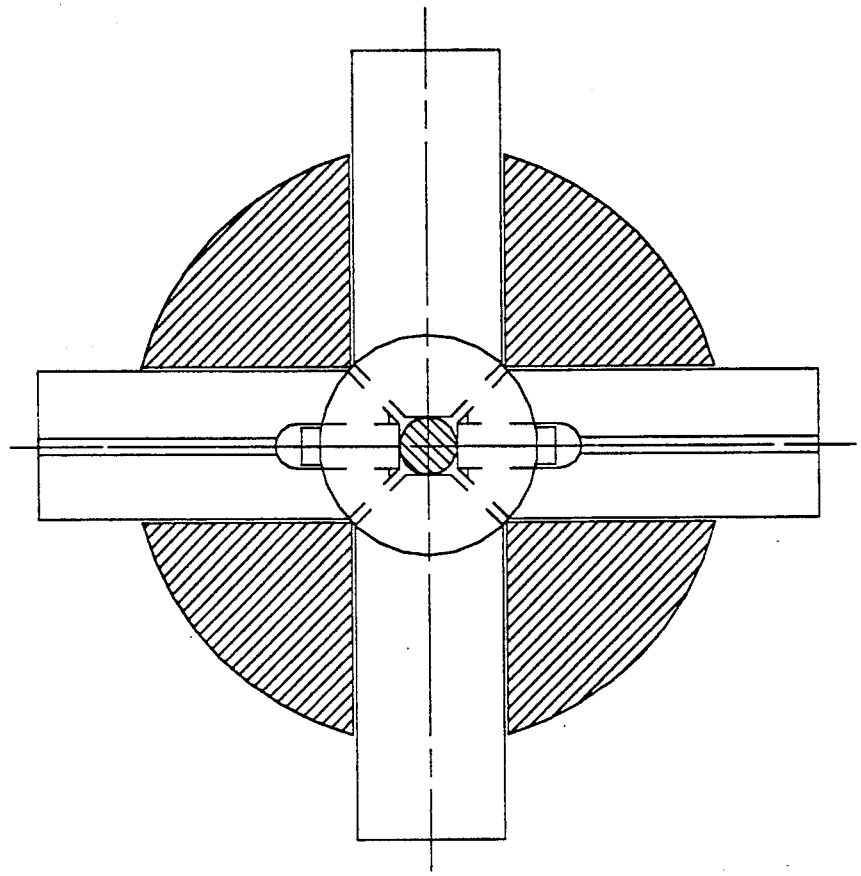
FIG. 9 is the view along lines 9—9 of FIG. 6.
Figure 10:
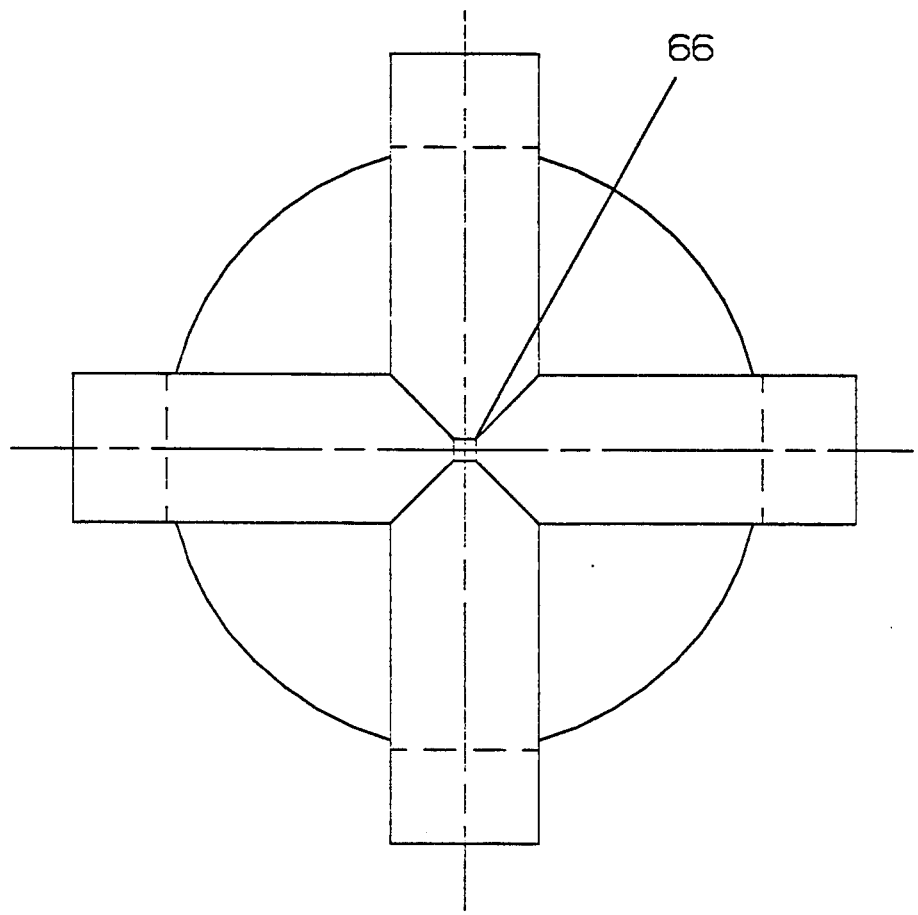
FIG. 10 is the view along lines 10—10 of FIG. 6.

Referring now to FIGS. 5 and 6, the same techniques can be employed to create a grabbing mechanism which can be particularly useful for grasping objects such as in robotic applications. In the preferred embodiment, there are four jaws 58, 60, 62, and 64 which are spaced on 90° intervals. As seen in FIGS. 8 and 10, the range of motion of the jaws is such that they all are disposed to come together at a point 66. To allow for greater contraction of the jaws, each jaw has a beveled tip comprising of two surfaces, such as 68 and 70 on jaw 62. As can readily be seen by comparing FIG. 8 to FIG. 10, the positioning of the jaws 58, 60, 62, and 64, along with the shape of their leading ends, allows them to come together at point 66 if an object is not placed in between. To get the four jaws 58, 60, 62, and 64 to move from the position in FIG. 8 to the position in FIG. 10, a mechanism, as previously described with respect to FIGS. 1 and 2, is employed. A central shaft 72 is connected to a motor schematically shown as arrow 74. As previously stated, any source of rotational movement may be used in lieu of a motor 74. Connected to shaft 72 are nuts 76 and 78. Shaft 72 is threaded with thread 80 being opposite hand from thread 82. Accordingly, rotation in a counterclockwise direction of motor 74 opens jaws 58, 60, 62, and 64 while opposite rotation of motor 74 brings the jaws 58, 60, 62, and 64 together. Jaws 62 and 64 are connected to nut 76 by links 84 and 86. Links 84 and 86 are each pivotally mounted by a pin connection to nut 76 and at their opposite ends are pinned to jaws 64 and 62, respectively. Mounted in a plane transverse to links 84 and 86, two additional links are similarly mounted between nuts 78 and jaws 58 and 60. It can readily been seen that counterclockwise rotation of shaft 72 using motor 74 drives down nut 76 and, as a result, separates jaws 62 and 64. At the same time, due to thread 82 being opposite hand when engaging nut 78, a similar effect occurs on the linkage supporting jaws 58 and 60 and they separate as well. All of the jaws 58, 60, 62, and 64 extend through openings 88 in body 90. Shaft 72 extends into a depression 92 in body 90. The extension of shaft 72 into depression 92 provides guided lateral movement. The essence of coupling 94 is that shaft 72 can still rotate even if one pair of jaws, such as 62 and 64, encounter an object before jaws 60 and 58 encounter the same object. Just as before, if for example, jaws 62 and 64 contact the object first, they can no longer move toward each other. As a result, nut 76 can no longer translate longitudinally and becomes fixed in position. Continuing rotational force applied from motor 74 results in shaft 72 continuing to turn but advancing with respect to nut 76 so that continuing movement can still bring jaws 58 and 60 closer together until they in turn encounter the object to be grasped. The reverse is also true. That is, if jaws 58 and 60 encounter the object first, the use of coupling 94 allows shaft 72 to keep turning so that jaws 62 and 64 can continue to advance until they, too, contact the object to be grasped. This feature is the self centering feature of the apparatus A.

Figure 11:
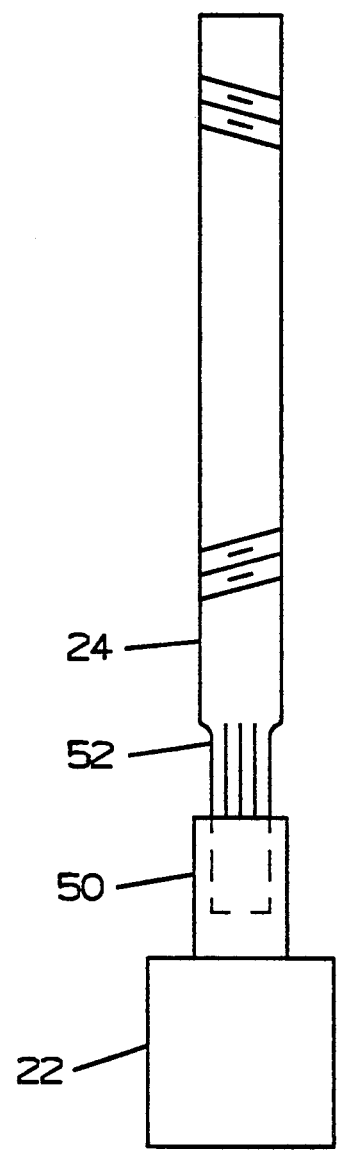
FIG. 11 is a schematic representation of a lost motion-type coupling.
Figure 12:
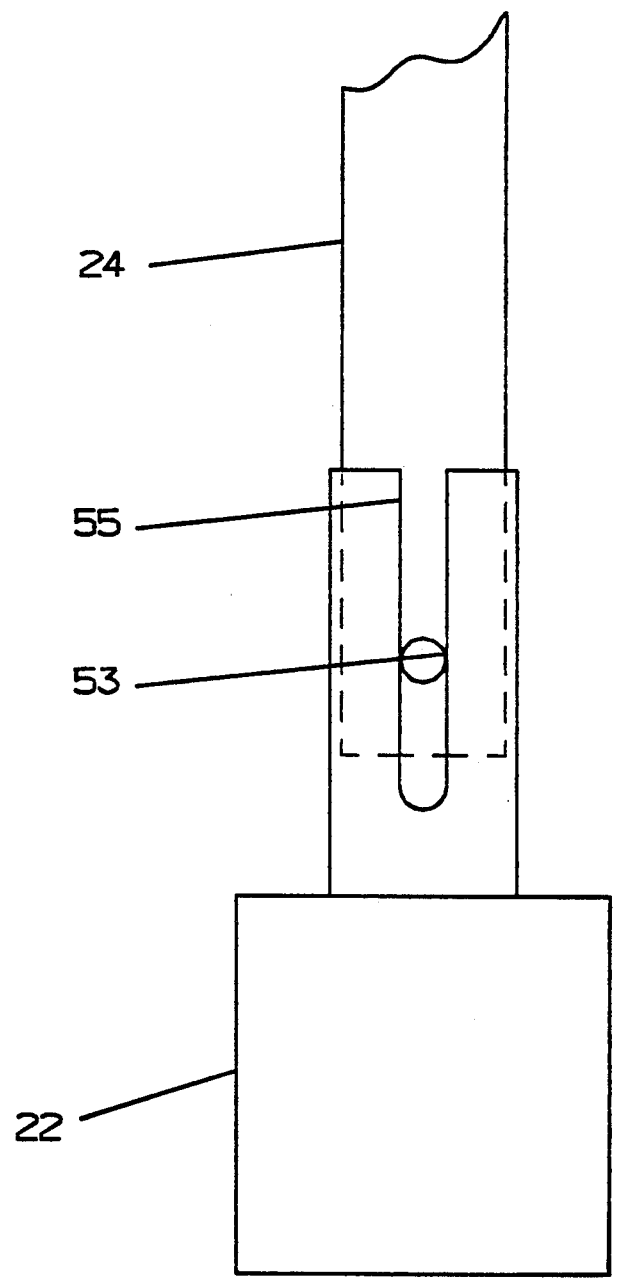
FIG. 12 is an alternative embodiment of the coupling in FIG. 11.

Coupling 94 (or coupling 50 in FIG. 2) can be constructed in one of many ways so long as continuing rotation by motor 74 allows contact between motor 74 and shaft 72 for transmission of rotational force while at the same time allowing shaft 72 to move longitudinally with respect to motor 74. One way to do this is to employ a coupling adjacent the motor 74 or motor 22, as shown in FIG. 1, which has a splined interior or a pin in slot arrangement shown in FIGS. 11 and 12. The end of shaft 24 is engaged to the coupling 50. For example, FIG. 11 depicts a splined coupling and FIG. 12 depicts a pin in slot coupling. Normally there is little resistance to moving shoes 14, 16, 18, 20, and rotation of shaft 24 will favor movement of nuts 28 and 30 with respect to shaft 24. However, when one of nuts 28 and 30 bind, continuing operation of motor 22 will move shaft 24 into or out of the coupling 52, while some of the spline 51 moves into or out of coupling 50. Alternatively, as shown in FIG. 12, pin 53 moves with respect to slot 55, while shaft 24 translates and rotates. This allows the driven shaft 24 components to move with respect to each other while the coupling 50 adjacent the motor 22 can continue to transmit rotational force.

Referring now to FIGS. 1 and 2, shoe 20 has a pair of surfaces 37 and 39 which come together at a ridge 41. (See FIG. 1.) The top of shoe 18 is similarly constructed. Shoes 14 and 16, on the other hand, have a similar configuration but on their bottom. One of the sloping surfaces 47 extends downwardly to a ridge 49, which conforms to a groove or valley 51, which guides shoes 14 and 16 and gives them torsional rigidity. As can readily be seen, when the shoes 14 and 16 are in contact with the object or well casing, links 36 and 38 exert a radial as well as downward component force with respect to shoes 14 and 16. The same occurs with respect to shoes 18 and 20 when they are in contact with the object or the casing. However, in the context of shoes 18 and 20, the linkage there creates an upward force to push ridge 41 into a guiding groove 51 in the housing 12. Thus, for each shoe, the ridge 41 or 49 is pushed into a mating groove in the housing 12. These grooves are located in openings 26 of housing 12. Accordingly, there is no "slop" in the interface between opening 26 and shoes 14, 16, 18, and 20. There is a heightened resistance to torque because the looseness that would normally be in linked components is eliminated in favor of the ridge and groove scheme of support for the shoes 14, 16, 18, and 20 as they extend and retract from housing 12.

Although this clamp invention is not limited to clamp shoes having a V-block feature, the V-block does provide additional stiffness in rotation. If the shoe is assumed to be fixed to the well casing and a torque was applied to the clamp housing in an attempt to dislodge the clamp, the housing would have to climb out of the V-groove to dislodge. The clamp linkages provide a component of force that secures the clamp shoe to the bottom of the V-groove and a radially outward component (or inward for robotic configuration) that secures the clamp shoe to the well casing I.D. Thus, the compliant nature of the linkages and pivot joints are isolated from the clamping scheme.

Alternatively a linear actuator (motor) may be employed to bring nuts 28 and 30 together or apart. No power screw, i.e., shaft, is necessary. The linear actuator configuration may sacrifice clamp stiffness somewhat.

The foregoing disclosure and description of the invention are illustrative and explanatory thereof, and various changes in the size, shape and materials, as well as in the details of the illustrated construction, may be made without departing from the spirit of the invention.

What is claimed is:

1. An apparatus for selective fixation of an object to another comprising:
   a housing;
   at least two shoes movably mounted to said housing;
   drive means mounted to said housing further comprising:
   at least one driver;
   at least one shaft operably connected to said driver;
   at least one linkage connecting said shaft to said shoe for selective movement of said shoe from a retracted position to an extended position for selective contact with the object; and
   lost motion means for allowing said driver to move one of said shoes after contact by another of said shoes with the object prevents its further movement.

2. The apparatus of claim 1, wherein:
   said lost motion means further comprises:
   a coupling connected to said shaft said coupling allowing said drive to operate one of said shoes through a linkage while another of said shoes has become immobile due to contact with the object.

3. The apparatus of claim 2, wherein:
   said coupling allows said shaft to selectively rotate or rotate with translation on its axis of rotation.

4. The clamp of claim 1, wherein:
   said housing having an opening for each of said shoes;
   said shoes extending through said formed openings and having indexing means for providing rigidity of said shoes against release when subjected to a torque.

5. The clamp of claim 4, wherein:
   said indexing means further comprises:
   a ridge on each shoe;

a conforming groove on each opening.

6. The clamp of claim 5, further comprising:
moving means for selectively moving said shoes radially for selective contact with the object where said moving means also provide a force pushing each of said ridges into its mating groove on each of said openings.

7. The clamp of claim 6, wherein:
each of said shoes has an upper and lower end;
at least one shoe has said ridge on its lower end while at least one other shoe in a different longitudinal plane has its ridge on its upper end.

8. A clamp for gripping an object, comprising:
a housing;
a plurality of shoes with said housing movable between a retracted position and an extended position for selective contact and release with the object;
a driver connected to said housing capable of producing at least a rotational output;
means for converting said rotational output of said driver into movement of said shoe between said expanded and retracted positions;
said means for converting said rotational output further comprising:
a shaft operably connected to said driver;
means on said shaft to selectively allow said driver to rotate said shaft to extend and retract all said shoes in tandem and to allow said shaft to rotate and translate on its axis to allow movement of at least one shoe when another is immobilized by contact with the object.

9. The apparatus of claim 8, wherein said means on said shaft comprises:
a coupling, said coupling connecting said driver to said shaft so as to allow rotation only of said shaft to move all said shoes, said coupling also allowing said driver to continue to drive said shaft as said shaft translates longitudinally on its axis of rotation thus allowing at least one shoe to be further driven while at least one other shoe is immobilized due to contact with the object, thus allowing the forces on all shoes to substantially equalize when grasping the object.

10. The apparatus of claim 9, wherein:
said means for converting rotational output further comprises:
a plurality of nuts mounted to said shaft;
means on said shaft to urge said nuts to translate in response to rotation of said shaft by said driver; and
each of said shoes connected by a linkage to at least one of said nuts.

11. The apparatus of claim 10, wherein:
a first pair of shoes is linked to a first nut and disposed for opposed radial movement in response to longitudinal movement of said first nut on said shaft;
a second pair of shoes is linked to a second nut and disposed for radial movement, in a different plane than said first pair of shoes, in response to longitudinal movement of said second nut on said shaft; p1
said shaft having a left-hand thread to drive said first nut and right-hand thread to drive said second nut, whereupon rotation of said shaft, said nuts move In opposite longitudinal directions while said first and second pair of shoes operate in tandem to extend or retract for selective contact with the object.

12. The apparatus of claim 11, wherein:
said coupling allows one of said nuts to be driven while the other has become immobilized due to contact with the object.

13. The apparatus of claim 12, wherein:
said first pair of shoes is linked to said first nut by links which cross over each other;
said second pair of shoes is linked to said second nut by links which cross over each other.

14. A clamp, comprising:
a housing having a longitudinal axis;
a plurality of shoes selectively movable with respect to said housing;
said housing having opening for each of said shoes;
said shoes extending through said formed openings and having guide means for providing rigidity of said shoes against release when subjected to a torque;
said quids means further comprises:
a ridge on each shoe;
a conforming groove on each opening; and
said shoes operable in different planes, extending through said longitudinal axis, for contact with an object.

15. The clamp of claim 14, further comprising:
moving means for selectively moving said shoes radially for selective contact with the object where said moving means also provide a force pushing each of said ridges into its mating groove on each of said openings.

16. The clamp of claim 15, wherein:
each of said shoes has an upper and lower end;
at least one shoe has said ridge on its lower end while at least one other shoe in a different longitudinal plane has its ridge on its upper end.

17. The clamp of claim 16, wherein said moving means further comprises:
a driver;
linkage means connecting said driver to said shoes for selective extension or retraction of said shoes with respect to said housing.

18. The clamp of claim 17, wherein said linkage means further comprises:
a shaft rotatably driven by said driver;
a plurality of nuts mounted to said housing and operably connected to said shaft; p1 a linkage connecting said shoes to at least one of said nuts, said linkage so positioned with respect to each said nut and shoe connected so as to force said ridge into said groove upon contact of said shoe with the object.

19. The clamp of claim 18, wherein:
means for selectively driving said shoes in tandem and to selectively drive at least one of said shoes independently of another for further contact with the object.

20. The clamp of claim 19, wherein said means for selectively driving further comprises:
a coupling, said coupling comprising lost motion means for allowing said driver to turn said shaft while at the same time allowing said shaft to translate longitudinally when contact by at least one of said sides prevents at least one of said nuts from moving longitudinally with respect to said turning shaft, thus allowing the forces applied to all shoes to substantially equalize when gripping the object.

21. The clamp of claim 16, wherein said moving means further comprises:
a driver;

linkage means connecting said driver to said shoes for selective extension or retraction of said shoes with respect to said housing.

22. The clamp of claim 17, wherein said linkage means further comprises:
a shaft rotatably driven by said driver;
a plurality of nuts mounted to said housing and operably connected to said shaft;
a linkage connecting said shoes to at least one of said nuts, said linkage so positioned with respect to each said nut and shoe connected so as to force said ridge into said groove upon contact of said shoe with the object.

23. The clamp of claim 22, wherein said means for selectively driving further comprises:
a coupling, said coupling comprising a lost motion mean for allowing said driver to turn said shaft while at the same time allowing said shaft to translate longitudinally when contact by at least one of said sides prevents at least one of said nuts from moving longitudinally with respect to said turning shaft, thus allowing the forces applied to all shoes to substantially equalize when gripping the object.

24. An apparatus for selective fixation of an object to another comprising:
a housing;
at least one shoe movably mounted to said housing;
drive means mounted to said housing further comprising:
at least one driver;
at least one shaft operably connected to said driver;
at least one linkage connecting said shaft to said shoe for selective movement of said shoe from a retracted position to an extended position for selective contact with the object;
at least a first nut connected by a first linkage to a first shoe;
at least a second nut connected by a second linkage to a second shoe; and
means on said shaft adjacent said first and second nut to move said first and second nuts in tandem for selective extension and retraction of said shoes.

25. The apparatus of claim 24, wherein:
said means to move on said shaft further comprises:
opposing hand threads operably connected to said first and second nuts respectively to drive them in opposite directions.

26. The apparatus of claim 25, wherein:
said first and second nut are linked respectively to said first and second shoes such that opposed motion of said nuts results in simultaneous extension or retraction of said shoes.

27. The apparatus of claim 26, further comprising:
a plurality of shoes linked to said first nut each movable in tandem in a different radial direction; and
a plurality of shoes linked to said second nut each movable in tandem in a different radial direction.

28. The apparatus of claim 27, further comprising:
lost motion means for allowing said plurality of shoes connected to one of said first or second nuts to continue to be driven by said shaft when said shoes linked to another of said nuts have become immobile due to contact with the object.

29. The apparatus of claim 28, wherein:
said lost motion means further comprises:
a coupling on said shaft allowing transmission of force from said driver to move said nuts in tandem and continue to move one of said nuts when the other said nut becomes immobile.

30. The apparatus of claim 28, wherein:
said shaft rotates to move said nuts in tandem with respect to the axis of rotation of said shaft; and
said coupling allowing at least a portion of said shaft to move with respect to at least one of said nuts that becomes immobile by translating along its axis of rotation with respect to said immobile nut, while at the same time further driving another said nut with respect to said shaft.

31. A clamp, comprising:
a housing having a longitudinal axis;
a plurality of shoes selectively movable with respect to said housing;
said shoes operable in different planes, extending through said longitudinal axis, for contact with an object; and
means for selectively driving said shoes in tandem and to selectively drive at least one of said shoes independently when at least another one of said shoes comes in contact with the object.

32. The clamp of claim 31, wherein:
said housing having an opening for each of said shoes;
said shoes extending through said formed openings and having guide means for providing rigidity of said shoes against release when subjected to a torque.

* * * * *

UNITED STATES PATENT AND TRADEMARK OFFICE
CERTIFICATE OF CORRECTION

PATENT NO. : 5,328,180
DATED : July 12, 1994
INVENTOR(S) : Benavides *et al.*

It is certified that error appears in the above-indentified patent and that said Letters Patent is hereby corrected as shown below:

In the drawing, Sheet 2, Figure 2, the direction of the hand threads on reference numeral 32 should be opposed to the direction of the hand threads on reference numeral 34 (*i.e.*, reference numerals 32 and 34 should be reverse threaded). Support for the opposite hand threads is found in the Specification at Column 3, lines 4-8.

In the drawing, Sheet 11, Figure 11, the position of the entire figure should be rotated 180° (*i.e.*, Figure 11 is "upside down") to correctly indicate the position of the motor on reference numeral 22.

In the drawing, Sheet 12, Figure 12, the position of the entire figure should be rotated 180° (*i.e.*, Figure 12 is "upside down") to correctly indicate the position of the motor on reference numeral 22.

Signed and Sealed this

Second Day of May, 1995

Attest:

BRUCE LEHMAN

Attesting Officer  Commissioner of Patents and Trademarks